(12) United States Patent
Hirakawa (10) Patent No.: US 12,339,898 B2
(45) Date of Patent: Jun. 24, 2025

(54) PROGRAM AND SEARCH SYSTEM FOR HAIRSTYLE IDENTIFICATION

(71) Applicant: ZOZO, INC., Chiba (JP)

(72) Inventor: Chinami Hirakawa, Mitaka (JP)

(73) Assignee: ZOZO, INC., Chiba (JP)

( * ) Notice: Subject to any disclaimer, the term of this patent is extended or adjusted under 35 U.S.C. 154(b) by 360 days.

(21) Appl. No.: 17/913,394

(22) PCT Filed: Mar. 26, 2021

(86) PCT No.: PCT/JP2021/012984
§ 371 (c)(1),
(2) Date: Sep. 21, 2022

(87) PCT Pub. No.: WO2021/193946
PCT Pub. Date: Sep. 30, 2021

(65) Prior Publication Data
US 2023/0177080 A1    Jun. 8, 2023

(30) Foreign Application Priority Data
Mar. 27, 2020  (JP) ................................ 2020-057643

(51) Int. Cl.
*G06T 7/11*    (2017.01)
*A45D 44/00*    (2006.01)
(Continued)

(52) U.S. Cl.
CPC ...... *G06F 16/5854* (2019.01); *G06F 16/5838* (2019.01); *G06T 7/11* (2017.01);
(Continued)

(58) Field of Classification Search
CPC .. G06F 16/5854; G06F 16/5838; G06F 16/53; G06T 7/11; G06T 7/70;
(Continued)

(56) References Cited

U.S. PATENT DOCUMENTS 10,943,371 B1 *   3/2021   Voss .................. H04N 21/8146
2017/0011067 A1   1/2017   Masuko et al.
(Continued)

FOREIGN PATENT DOCUMENTS

CN    110738595 A  *  1/2020  ........... G06T 3/0012
WO    2015/114785 A1    8/2015

OTHER PUBLICATIONS

Kawagishi, Kina et al., "Hairstyle Image Search Method that Considers Individual Clothing.", CVIM-212, Technical Report, (2018), vol. 2018, pp. 1-7.
(Continued)

*Primary Examiner* — John Villecco
*Assistant Examiner* — Kyla Guan-Ping Tiao Allen
(74) *Attorney, Agent, or Firm* — Oliff PLC (57) ABSTRACT

A search system and the like is capable of accurately retrieving a captured image of a hairstyle specified by a user. The search system includes: a head region extraction unit that extracts a head region of a person from a captured image; an orientation estimation unit that estimates a face orientation of the person from the head region; a mask image generation unit that generates a mask image in which a hair region and a remaining region in the head region are distinguished from each other; a hairstyle identification unit that identifies a hairstyle of the person from the mask image using a result of the estimation of the face orientation; an operation accepting unit that accepts an operation of specifying a hairstyle by a user; and a captured image extraction unit that extracts a captured image based on the hairstyle specified in the operation and the identified hairstyle.

9 Claims, 7 Drawing Sheets

(51) Int. Cl.
  *G06F 16/583* (2019.01)
  *G06T 7/00* (2017.01)
  *G06T 7/70* (2017.01)
  *G06T 7/90* (2017.01)
  *G06V 10/74* (2022.01)
  *G06V 40/16* (2022.01)

(52) U.S. Cl.
  CPC .................. *G06T 7/70* (2017.01); *G06T 7/90* (2017.01); *G06V 10/761* (2022.01); *G06T 2207/10024* (2013.01); *G06T 2207/30201* (2013.01)

(58) Field of Classification Search
  CPC ............. G06T 7/90; G06T 2207/10024; G06T 2207/30201; G06T 7/00; G06V 10/761; G06V 40/161; A45D 44/00
  See application file for complete search history.

(56) References Cited

U.S. PATENT DOCUMENTS

| 2018/0374242 | A1* | 12/2018 | Li | G06T 15/04 |
| 2019/0012796 | A1* | 1/2019 | Yamasaki | G06T 7/11 |
| 2019/0266807 | A1* | 8/2019 | Lee | G06T 19/20 |
| 2019/0279347 | A1* | 9/2019 | Hayasaka | G06V 40/165 |
| 2020/0193503 | A1* | 6/2020 | Mathiaszyk | G06Q 30/0623 |
| 2020/0211184 | A1* | 7/2020 | Fukuda | G06F 18/22 |
| 2020/0312002 | A1* | 10/2020 | Comploi | G06V 40/172 |

OTHER PUBLICATIONS

Author Unknown, "Fashion Coordinate Ichiran - WEAR", (retrieved Mar. 9, 2019), URL: https://wear.jp/coordinate/.

Apr. 27, 2021 International Search Report issued in Patent Application No. PCT/JP2021/012984. .

* cited by examiner

| POSTED IMAGE ID | CLUSTER | SCORE | | | | | |
|---|---|---|---|---|---|---|---|
| | | HAIR-STYLE A | HAIR-STYLE B | HAIR-STYLE C | HAIR-STYLE D | HAIR-STYLE E | HAIR-STYLE F |
| 001 | 3 | 90 | 60 | 50 | 20 | 10 | 5 |
| 002 | 1 | 20 | 30 | 80 | 90 | 70 | 40 |
| 003 | 6 | ... | ... | ... | ... | ... | ... |
| ... | ... | ... | ... | ... | ... | ... | ... |

PROGRAM AND SEARCH SYSTEM FOR HAIRSTYLE IDENTIFICATION

TECHNICAL FIELD

The present invention relates to a program and a search system.

BACKGROUND ART

A service is typically known in which captured images (images capturing a person) captured and uploaded by a user (a posting user) are accumulated in a server, and a captured image that matches a hairstyle specified by a user (a viewing user) viewing captured images is retrieved and presented (see Non-Patent Literature 1).

CITATION LIST

Non-Patent Literature

Non-Patent Literature 1: Author unknown, "Fashion Coordinate Ichiran—WEAR", [online], Publication date unknown, [retrieved on Mar. 9, 2019], the Internet (URL: https://wear.jp/coordinate/)

SUMMARY OF INVENTION

Technical Problem

In typical services, a hairstyle input by the posting user is registered in association with the captured image, and captured images that match the hairstyle specified by the viewing user are retrieved based on this registered information. Thus, if the registered information is incorrect (the hairstyle input by the posting user and the hairstyle of the person in the captured image uploaded by the posting user are different from each other), the search result intended by the viewing user may not be retrieved.

The present invention has been made in view of the above-described problems. An object of the present invention is to provide a program and a search system capable of accurately retrieving a captured image of a hairstyle specified by a user.

Solution to Problem (1) An aspect of the present invention relates to a program for retrieving, from among a plurality of captured images capturing a person, a captured image of a hairstyle specified by a user, the program causing a computer to operate as: a head region extraction unit configured to extract a head region of a person from a captured image; an orientation estimation unit configured to estimate a face orientation of the person from the head region; a mask image generation unit configured to generate a mask image in which a hair region and a remaining region in the head region are distinguished from each other; a hairstyle identification unit configured to identify a hairstyle of the person from the mask image using an estimation result of the face orientation; an operation accepting unit configured to accept an operation of specifying a hairstyle by a user; and a captured image extraction unit configured to extract a captured image based on the hairstyle specified in the operation and the identified hairstyle. Furthermore, an aspect of the present invention relates to a computer-readable information storage medium that stores the program described above. Furthermore, an aspect of the present invention relates to a search system including the units described above.

According to the present invention, the hairstyle of the person is identified, from a mask image in which a hair region and a remaining region in the head region of a captured image are distinguished from each other, using an result of the estimation by the face orientation. Thus, a captured image of a hairstyle specified by the user can be accurately retrieved without being easily affected by the face orientation of the person in the captured image.

(2) Furthermore, in the program, information storage medium, and search system according to an aspect of the present invention, a storage unit of the computer may be configured to store representative mask images that are mask images each generated from a captured image prepared in advance and that are prepared for each face orientation and for each hairstyle specifiable by the user, respectively; the hairstyle identification unit may calculate degrees of similarity between the mask image and representative mask images having a face orientation common to that of the mask image; and the captured image extraction unit may extract a captured image corresponding to a mask image having a high degree of similarity with a representative mask image of the hairstyle specified in the operation.

According to the present invention, a representative mask image is prepared for each face orientation and for each specifiable hairstyle, the degree of similarity between the mask image generated from the captured image and representative mask images having a face orientation common to the mask image is calculated, and a captured image corresponding to a mask image having a high degree of similarity with a representative mask image of the specified hairstyle is extracted. Thus, a captured image of a hairstyle specified by the user can be accurately retrieved without being easily affected by the face orientation of the person in the captured image.

(3) Furthermore, in the program, information storage medium, and search system according to an aspect of the present invention, the operation accepting unit may accept a captured image transmitted from a terminal of the user or an image drawn by the user, and treat the hairstyle of the person identified from the image as the hairstyle specified in the operation.

According to the present invention, the user can specify the hairstyle by uploading a captured image of the intended hairstyle or drawing the intended hairstyle, and thus the convenience of the user can be enhanced.

(4) Furthermore, in the program, information storage medium, and search system according to an aspect of the present invention, the operation accepting unit may accept, as the operation, an operation of adjusting a length and/or an amount of a reference hairstyle, and treat the hairstyle after adjustment as the hairstyle specified in the operation.

According to the present invention, the user can specify the hairstyle by optionally adjusting the length and/or the amount of a reference hairstyle, and thus the convenience of the user can be enhanced.

(5) Furthermore, in the program, information storage medium, and search system according to an aspect of the present invention, the hairstyle identification unit may identify a hair color of the person from the captured image; the operation accepting unit may accept an operation of specifying a hairstyle and a hair color by the user; and the captured image extraction unit may extract the captured image based on the hairstyle and hair color specified in the operation and the identified hairstyle and hair color.

According to the present invention, the user can specify not only the hairstyle but also the hair color, and thus the convenience of the user can be enhanced.

DESCRIPTION OF EMBODIMENTS

Hereinafter, the present embodiment will be described. Note that the present embodiment described below do not unduly limit the contents of the present invention described in the claims. Furthermore, not all configurations described in the present embodiment necessarily constitute necessary requirements of the present invention.

1. Configuration

Figure 1:
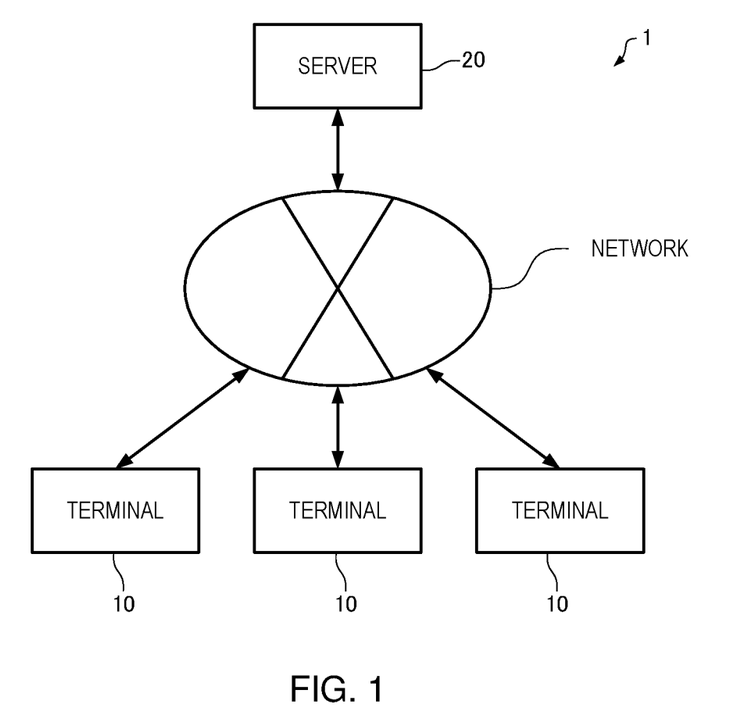
FIG. 1 is a diagram illustrating a search system according to the present embodiment.

FIG. 1 is a diagram illustrating a search system according to the present embodiment. A search system 1 includes a plurality of terminals 10 and a server 20. The terminals 10 are each an information processing device such as a mobile terminal (a smartphone and a tablet terminal) and a personal computer (PC), and is a device connectable to the server 20 via a network (such as the Internet). The server 20 accumulates captured images (images capturing a person) captured by the user, retrieves a captured image of the hairstyle specified by the user from among a plurality of captured images that have been accumulated, and represents the retrieved images to the user. The user can upload captured images to the server 20 or view captured images accumulated in the server 20 by accessing the server 20 using a Web browser or a dedicated application executed on the terminal 10. Hereinafter, the user uploading a captured image is referred to as the posting user, and the user viewing a captured image is referred to as the viewing user.

Figure 2:
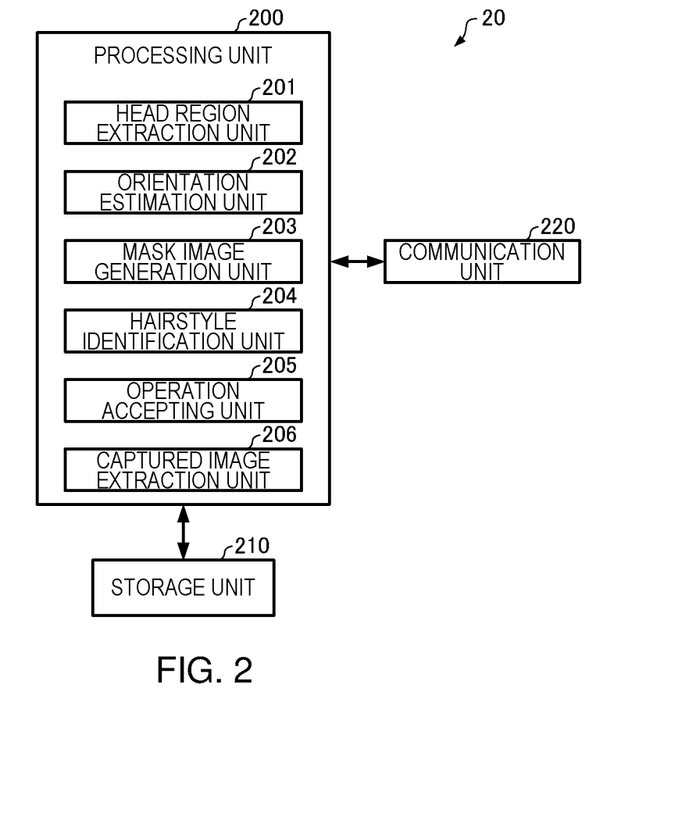
FIG. 2 is a diagram illustrating an example of a functional block diagram of a server.

FIG. 2 illustrates an example of a functional block diagram of the server 20. Note that the server of the present embodiment may have a configuration in which a portion of the components (parts) illustrated in FIG. 2 is omitted. The server 20 includes a processing unit 200, a storage unit 210, and a communication unit 220.

The storage unit 210 stores a program and/or various data for causing a computer to function as parts of the processing unit 200, and also functions as a work area of the processing unit 200. The functions of the storage unit 210 can be realized by a hard disk, a random access memory (RAM), or the like. The storage unit 210 stores captured images received (uploaded) from the terminal 10 of the posting user.

The communication unit 220 performs various control for communicating with the terminals 10. The functions of the communication unit 220 can be realized by hardware such as various processors or an application-specific integrated circuit (ASIC) for communication, a program, or the like.

The processing unit 200 (processor) performs various processing, such as management of user information, processing related to login/logout, image processing, image search processing, and communication control processing, based on the data, program, or the like transmitted from the terminals 10 and received via the communication unit 220. Functions of the processing unit 200 can be implemented by hardware such as various processors (a CPU, DSP, or the like) and an ASIC (a gate array or the like), and programs. The processing unit 200 includes a head region extraction unit 201, an orientation estimation unit 202, a mask image generation unit 203, a hairstyle identification unit 204, an operation accepting unit 205, and a captured image extraction unit 206.

The head region extraction unit 201 extracts, from a captured image stored in the storage unit 210 (a captured image uploaded by the posting user), the head region of a person.

The orientation estimation unit 202 estimates the face orientation of the person from the head region extracted from the captured image. The information on the estimation result is stored in the storage unit 210 in association with the captured image.

The mask image generation unit 203 generates a mask image in which the hair region and a remaining region in the head region extracted from the captured image are distinguished from each other.

The hairstyle identification unit 204 identifies the hairstyle of the person, from the mask image generated from the captured image, using the estimation result of the face orientation. Information on the identification result is stored in the storage unit 210 in association with the captured image.

The operation accepting unit 205 receives, from the terminal 10 of the viewing user, operation information on an operation of specifying a hairstyle (e.g., an operation of selecting an icon or text indicating the hairstyle), and accepts such operation.

Based on the hairstyle specified in the operation accepted by the operation accepting unit 205 and the hairstyle identified by the hairstyle identification unit 204, the captured image extraction unit 206 extracts (retrieves) a captured image from among a plurality of captured images stored in the storage unit 210. The processing unit 200 performs control to display the captured image extracted by the captured image extraction unit 206 on the display unit of the terminal 10 of the viewing user who performed the operation of specifying the hairstyle.

Furthermore, when representative mask images that are mask images each generated from a captured image prepared in advance and that are prepared respectively for each face orientation and for each hairstyle specifiable by the user are stored in the storage unit 210, the hairstyle identification unit 204 may calculate the degrees of similarity between the mask image generated from a captured image stored in the storage unit 210 and representative mask images having a face orientation common to that of the mask image (identify the hairstyle of the person from the mask image using the estimation result of the face orientation), and the captured image extraction unit 206 may extract a captured image corresponding to a mask image having a high degree of similarity with a representative mask image of the hairstyle specified in the operation accepted by the operation accepting unit 205.

2. Approach of Present Embodiment

Next, the approach of the present embodiment will be described using drawings. In the search system according to the present embodiment, representative mask images that are mask images (images in which the hair region and a remaining region in the head region of the person are distinguished from each other) each generated from a captured image (an image capturing a person) prepared in advance and that are prepared for each face orientation and for each hairstyle specifiable by the viewing user are stored in the storage unit 210. Then, the degrees of similarity between the mask image generated from a captured image (a posted image) uploaded by the posting user and representative mask images having a face orientation common to the mask image are calculated. These degrees of similarity are used to retrieve a posted image corresponding to the hairstyle specified by the viewing user. First, an approach to create representative mask images will be described below.

Figure 3:
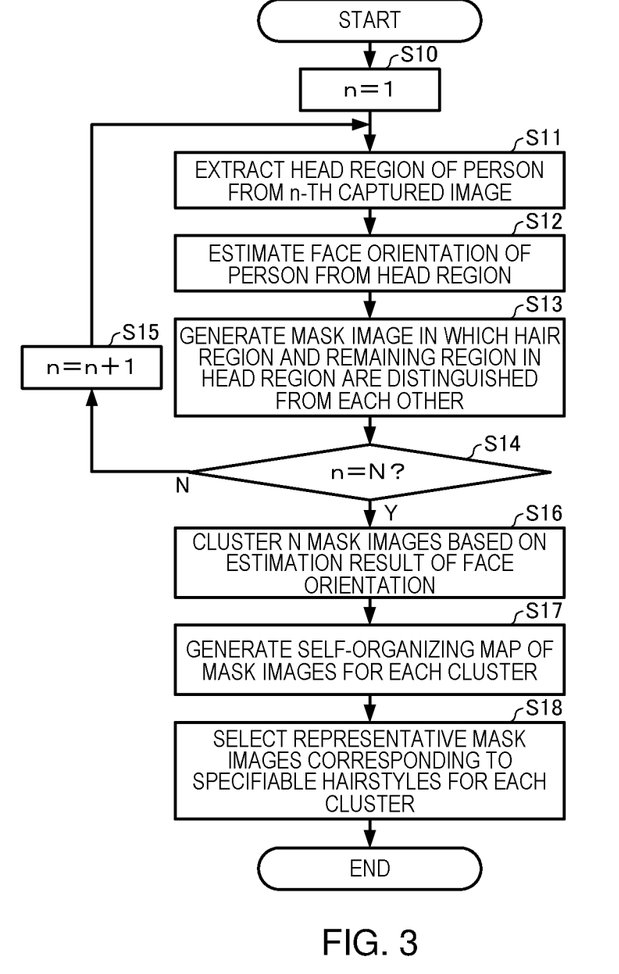
FIG. 3 is a flowchart illustrating a flow of procedures for creating representative mask images.

FIG. 3 is a flowchart illustrating the flow of procedures for creating representative mask images. Prior to this, a large number of captured images of a person with various hairstyles in various face orientations are prepared in advance.

First, the processing unit 200 sets the variable n to 1 (step S10). Next, the head region extraction unit 201 recognizes, by image recognition, the head region (the region including the face and the hair on the head) of a person in the n-th captured image prepared in advance, and extracts the head region from the captured image based on the recognition result (step S11).

Next, the orientation estimation unit 202 estimates the face orientation of the person from the extracted head region (step S12). For example, facial sites in the head region (feature points such as the eyes, nose, and mouth) are recognized by image recognition, and the face orientation is estimated based on the positional relationship among the recognized sites and the like. Here, of the pitch (the vertical orientation of the face), the roll (the tilt of the face), and the yaw (the lateral orientation of the face), only the value of the yaw is used as the estimated face orientation.

Figure 4:
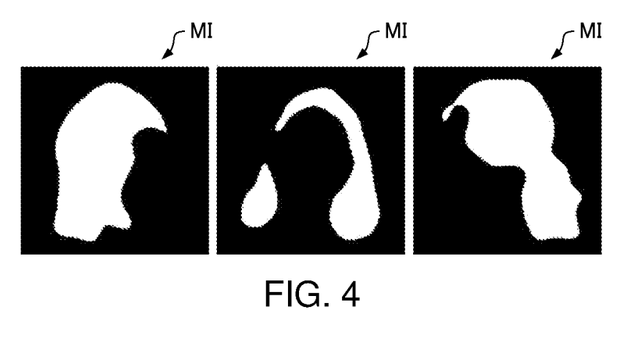
FIG. 4 is a view illustrating examples of a mask image generated from a head region of a captured image.

Next, the mask image generation unit 203 recognizes, by image recognition, the hair region in the extracted head region, and generates a mask image in which the hair region and a remaining region are distinguished from each other based on the recognition result (step S13). FIG. 4 illustrates examples of a mask image generated from the head region of a captured image. The mask images MI illustrated in FIG. 4 are images (two-value images or gray scale images) in which, of the head region, the hair region has the maximum luminance value (pixel value), and a remaining region has the minimum luminance value.

Next, the processing unit 200 determines whether the variable n has reached N, where N is the number of captured images prepared in advance (step S14). If the variable n has not reached N (N in step S14), the variable n is incremented by 1 (step S15), and the processing proceeds to step S11.

Figure 5:
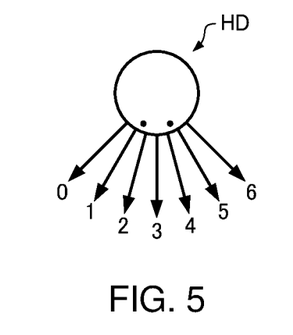
FIG. 5 is a diagram for explaining clustering of face orientations.

If the variable n has reached N (Y in step S14), the processing unit 200 performs clustering of N mask images based on the estimation result (yaw value) of the face orientation (step S16). Here, the N mask images are clustered into seven clusters of "0" to "6". As illustrated in FIG. 5, the cluster in which the estimated face (head HD) orientation is to the rightmost is "0", the cluster in which the estimated face (head HD) orientation is to the front is "3", and the cluster in which the estimated face (head HD) orientation is to the leftmost is "6".

Figure 6:
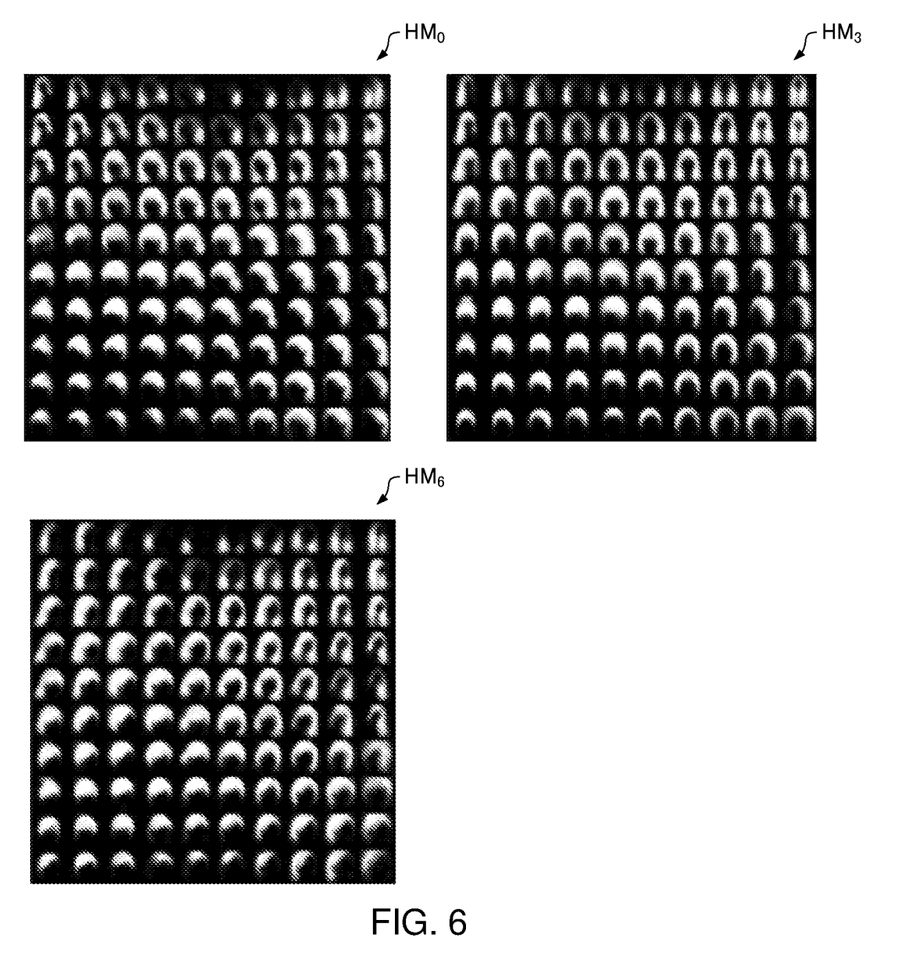
FIG. 6 is a view illustrating examples of a hairstyle map.

Next, the processing unit 200 generates a self-organizing map (SOM) of mask images (pixel information of the hair region) for each cluster (step S17). That is, for each cluster, a self-organizing map is trained using mask images as input vectors. This allows the degree of similarity between mask images to be represented by the distance on the map for each cluster. FIG. 6 is a view illustrating examples of a map (hairstyle map) obtained by inversely mapping the generated self-organizing map. The hairstyle map $HM_0$ is a hairstyle map obtained from the self-organizing map of mask images for the cluster "0", in which mask images each having a right-facing face orientation are arranged in a lattice manner (in this case, in ten rows and ten columns), with the relationship of continuous similarity in hairstyle being maintained. Similarly, the hairstyle map $HM_3$ is a hairstyle map obtained from the self-organizing map of mask images (each having a front-facing face orientation) for the cluster "3", and the hairstyle map $HM_6$ is a hairstyle map obtained from the self-organizing map of mask images (each having a left-facing face orientation) for the cluster "6".

Figure 7:
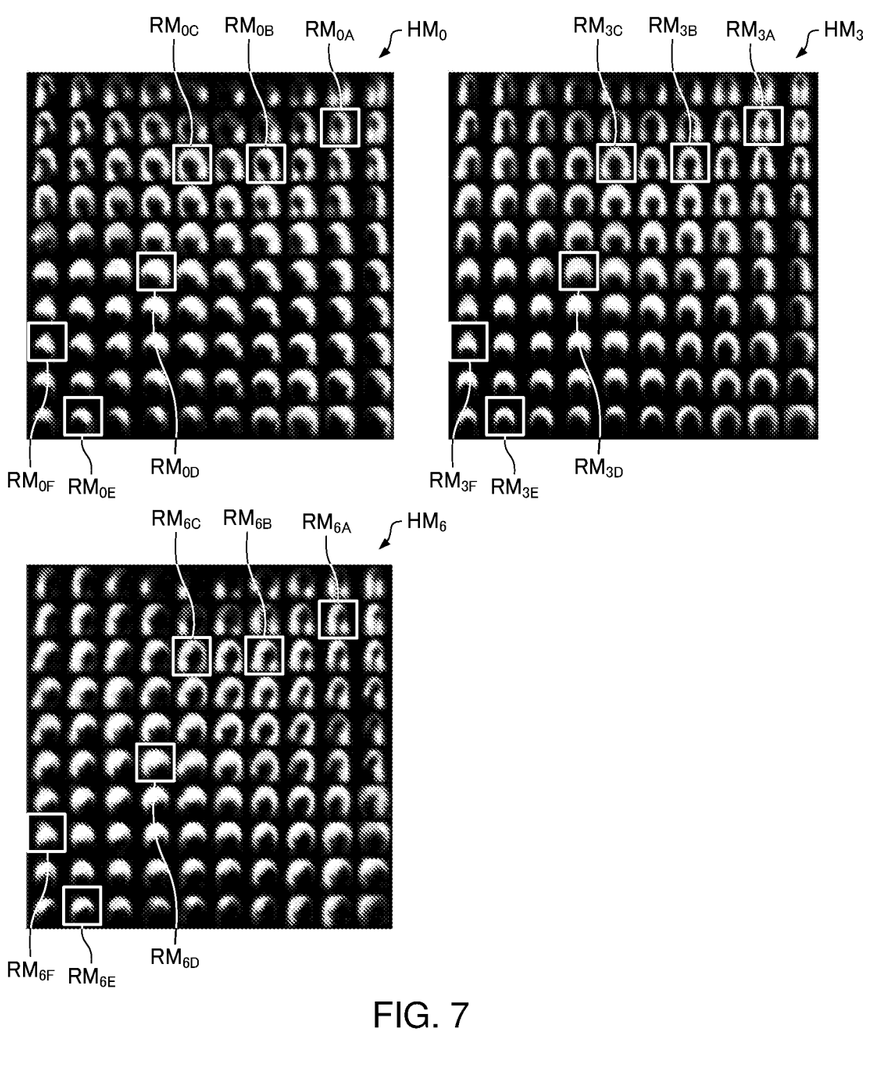
FIG. 7 is a view illustrating examples of selection of representative mask images.

Next, representative mask images, which are mask images corresponding to the hairstyles specifiable by the viewing user, are selected from the hairstyle map for each cluster (step S18). Here, it is assumed that the viewing user can specify six types of hairstyles including "Long hair" (hereinafter referred to as the "hairstyle A"), "Medium hair" (hereinafter referred to as the "hairstyle B"), "Bob" (hereinafter referred to as the "hairstyle C"), "Short hair" (hereinafter referred to as the "hairstyle D"), "Very short hair" (hereinafter referred to as the "hairstyle E"), and "Up" (hereinafter referred to as the "hairstyle F"). In the example illustrated in FIG. 7, from the hairstyle map $HM_0$ for the cluster "0", a representative mask image $RM_{0A}$ corresponding to the "hairstyle A", a representative mask image $RM_{0B}$ corresponding to the "hairstyle B", a representative mask image $RM_{0C}$ corresponding to the "hairstyle C", a representative mask image $RM_{0D}$ corresponding to the "hairstyle D", a representative mask image $RM_{0E}$ corresponding to the "hairstyle E", and a representative mask image $RM_{0F}$ corresponding to the "hairstyle F" are selected. Similarly, from the hairstyle map $HM_3$ for the cluster "3", representative mask images $RM_{3A}$ to $RM_{3F}$ corresponding to the "hairstyle A" to the "hairstyle F" are selected; and from the hairstyle map $HM_6$ for the cluster "6", representative mask images $RM_{6A}$ to $RM_{6F}$ corresponding to the "hairstyle A" to the "hairstyle F" are selected. Similar selections are performed for the other clusters. Thus, a representative mask image is selected for each of the face orientations (seven clusters) and for each of the hairstyles specifiable by the viewing user (six types of hairstyles). Note that the representative mask images corresponding to the same hairstyle are disposed at the same position in each hairstyle map. For example, the representative mask images corresponding to the "hairstyle A" are located at the second row and the ninth column in each hairstyle map; and the representative mask images corresponding to the "hairstyle B" are located at the third row and the seventh column in each hairstyle map. That is, once the representative mask images of the respective hairstyles are selected from the hairstyle map for any of the clusters, the representative mask images of the respective hairstyles can be automatically selected from the hairstyle maps for the other clusters.

Figure 8:
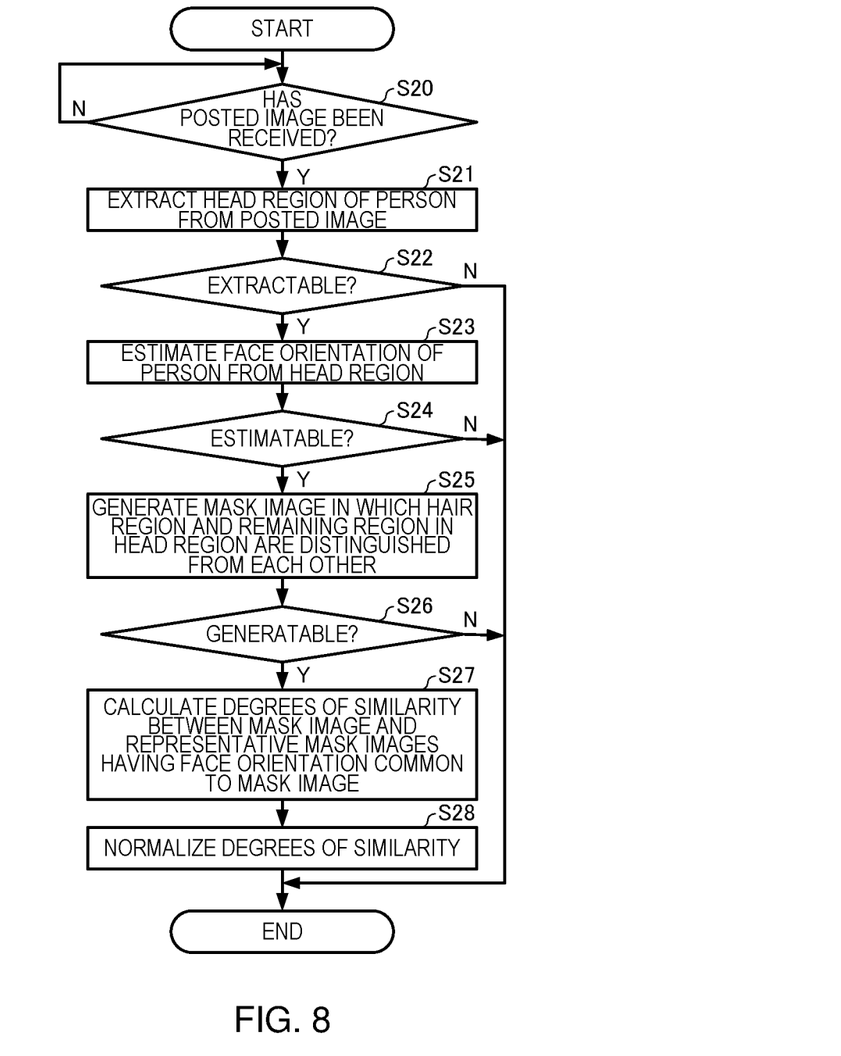
FIG. 8 is a flowchart illustrating a flow of processing for identifying the hairstyle from a posted image.

Next, an approach to identify the hairstyle from a posted image will be described. FIG. 8 is a flowchart illustrating the flow of processing for identifying the hairstyle from a posted image. Steps S21, S23, and S25 in FIG. 8 represent processing that is the same as or similar to that of steps S11 to S13 in FIG. 3, respectively.

First, the processing unit 200 determines whether a posted image has been received (a posted image has been uploaded) from the terminal 10 of the user (posting user) (step S20). If a posted image has been received (Y in step S20), the head region extraction unit 201 recognizes, by image recognition, the head region of the person in the posted image, and extracts the head region from the posted image based on the recognition result (step S21).

If the head region has been successfully recognized and extracted (Y in step S22), the orientation estimation unit 202 recognizes, by image recognition, the facial sites in the extracted head region, estimates the face orientation (yaw) of the person based on the positional relationship among the recognized sites and the like, and determines the cluster (any of "0" to "6") to which the estimated face orientation belongs (step S23).

If facial sites have been successfully recognized and the face orientation has been successfully estimated (Y in step S24), the mask image generation unit 203 recognizes, by image recognition, the hair region in the extracted head region, and generates a mask image in which the hair region and a remaining region from the head region are distinguished from each other based on the recognition result (step S25).

If the hair region has been successfully recognized and a mask image has been successfully generated (Y in step S26), the hairstyle identification unit 204 calculates the degrees of similarity (distance) between the mask image and representative mask images having a face orientation (cluster) common to the mask image using a distance function or the like (step S27). For example, if the cluster to which the face orientation of the mask image belongs is "0", the degrees of similarity between the mask image and the representative mask images $RM_{0A}$ to $RM_{0F}$ corresponding to the "hairstyle A" to the "hairstyle F" of the cluster "0" is calculated, respectively. The calculated degrees of similarity are treated as the scores of the posted image in terms of the respective hairstyles (the identification results of the hairstyle). Next, the hairstyle identification unit 204 normalizes the scores (the degrees of similarity) calculated in step S27 from the distribution of the scores of the posted images uploaded thus far (step S28). Note that if the head region cannot be recognized (N in step S22), if the face orientation cannot be estimated (N in step S24), or if the hair region cannot be recognized (N in step S26), the processing is terminated.

Figure 9:
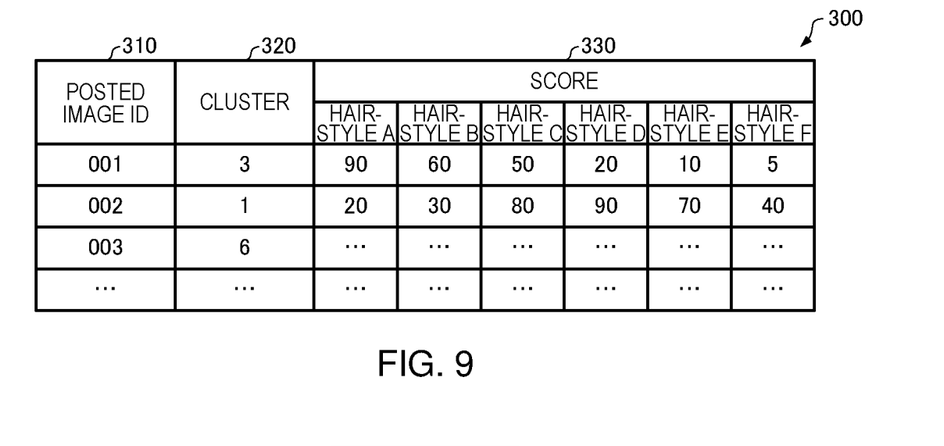
FIG. 9 is a diagram illustrating an example of a table storing information on posted images.

FIG. 9 is a diagram illustrating an example of a table storing information on posted images (the estimation results of the face orientation and the identification results of the hairstyle). This table is stored in the storage unit 210. The table 300 stores, in association with the posted image ID 310 for identifying the posted image, the cluster 320 to which the face orientation of the posted image belongs, and the scores 330 of the posted image in terms of the respective hairstyles. In the example illustrated in FIG. 9, for example, the cluster to which the face orientation of the posted image having a posted image ID of "001" belongs is "3" (front-facing); the score of the posted image in terms of the "hairstyle A" (the degree of similarity with the representative mask image $RM_{3A}$) is "90"; the score in terms of the "hairstyle B" (the degree of similarity with the representative mask image $RM_{3B}$) is "60"; the score in terms of the "hairstyle C" (the degree of similarity with the representative mask image $RM_{3C}$) is "50"; the score in terms of the "hairstyle D" (the degree of similarity with the representative mask image $RM_{3D}$) is "20"; the score in terms of the "hairstyle E" (the degree of similarity with the representative mask image $RM_{3E}$) is "10"; and the score in terms of the "hairstyle F" (the degree of similarity with the representative mask image $RM_{3F}$) is "5".

Figure 10:
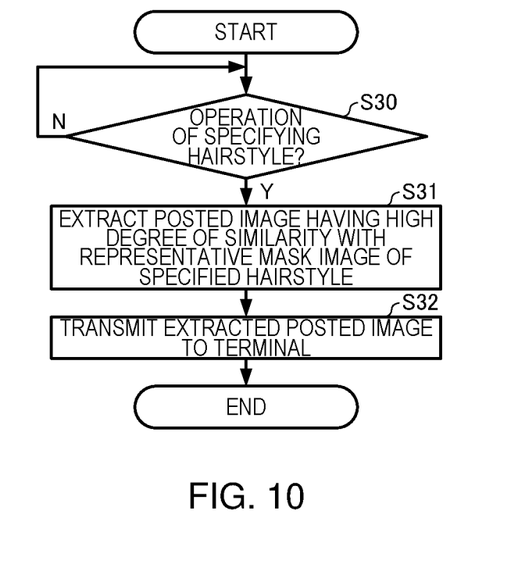
FIG. 10 is a flowchart illustrating a flow of processing for retrieving a posted image.

Next, an approach to retrieve a posted image will be described. FIG. 10 is a flowchart illustrating the flow of processing for retrieving a posted image.

First, the operation accepting unit 205 determines whether information to the effect that an operation of specifying the hairstyle (any of the "hairstyle A" to the "hairstyle F") was performed has been received from the terminal 10 of the user (viewing user) (step S30). If information to the effect that such an operation was performed has been received (Y in step S30), the captured image extraction unit 206 extracts, from among the posted images stored in the storage unit 210, a posted image of which the score in terms of the hairstyle specified in the operation (the degree of similarity with a representative mask image of the hairstyle) is high (step S31). More specifically, with reference to the table 300, the captured image extraction unit 206 may extract M high-ranking posted images of which the scores in terms of the specified hairstyle are high (where M is a predetermined number or a number specified by the viewing user), or extract any posted images of which the scores in terms of the specified hairstyle are not less than a predetermined value. For example, if the specified hairstyle is the "hairstyle A", M high-ranking posted images of which the scores in terms of the "hairstyle A" (the degrees of similarity with the representative mask images $RM_{0A}$ to $RM_{6A}$) are high, or any posted images of which the scores in terms of the "hairstyle A" are not less than a predetermined value are extracted. Next, the processing unit 200 transmits the extracted posted images to the terminal 10 of the viewing user, and performs control to cause the extracted posted images to be displayed on the display unit of the terminal 10 (step S32).

According to the search system according to the present embodiment, representative mask images are prepared for each face orientation and for each specifiable hairstyle; the degrees of similarity between the mask image generated from a posted image and the representative mask images of the respective hairstyles having a face orientation common to the mask image are derived as scores of the posted image in terms of the respective hairstyles; and posted images having high scores in terms of the hairstyle specified by the viewing user are extracted. Thus, a posted image of the hairstyle specified by the user can be accurately retrieved without being easily affected by the face orientation of the person in the posted image.

The present invention is not limited to the embodiment described above, and various modifications can be made. For example, any term cited with a different term having a broader meaning or the same meaning in the specification and the drawings may be replaced by the different term in any place in the specification and the drawings.

For example, the operation of specifying the hairstyle by the viewing user is not limited to the aspect in which the hairstyle is directly specified, but may include an aspect in which the viewing user uploads a captured image (an image capturing a person's hairstyle) to the server 20, or an aspect in which the viewing user depicts the hairstyle on a Web browser or a dedicated application. In this case, the operation accepting unit 205 accepts an image transmitted from the terminal 10 of the viewing user or an image drawn by the viewing user, and the hairstyle is identified from the image by the processing of step S21 and beyond in FIG. 8. That is, the head region extraction unit 201 extracts the head region from the image; the orientation estimation unit 202 estimates the face orientation from the head region; the mask image generation unit 203 generates a mask image from the head region; the hairstyle identification unit 204 derives the degrees of similarity between the mask image and the representative mask images of the respective hairstyles having a face orientation common to the mask image, and treats the degrees of similarity as the scores of the image in terms of the respective hairstyles. Then, the operation accepting unit 205 treats the hairstyle having the highest score (identified hairstyle) as the hairstyle specified in the operation. For example, if, of the scores of the image in terms of the respective hairstyles, the score in terms of the "hairstyle A" is the highest, then the processing of step S31 and beyond in FIG. 10 is performed assuming that the "hairstyle A" has been specified by the viewing user. In this way, the viewing user can specify the hairstyle by uploading a captured image of the intended hairstyle to the server 20 or drawing the intended hairstyle, and thus the convenience of the viewing user can be enhanced.

Furthermore, as the operation of specifying the hairstyle, an operation of adjusting the length and/or the amount (volume) of a reference hairstyle may be accepted, and the hairstyle after adjustment may be treated as the hairstyle specified in the operation. For example, based on an operation of adjusting the length and/or the amount of the hairstyle, a mask image corresponding to the hairstyle after the adjustment may be determined from the hairstyle map illustrated in FIG. 6 (for example, if the hairstyle after adjustment is long or large in amount, a mask image disposed on the upper right side is adopted; and if the adjusted hairstyle is short or small in amount, a mask image disposed on the lower left side is adopted), and posted images of which the scores (the degrees of similarity) in terms of the adopted mask image are high may be extracted. In this case, the degrees of similarity between the mask image generated from the posted image and the respective mask images included in the hairstyle map for a face orientation common to the mask image are calculated in advance.

Furthermore, the viewing user may be enabled to specify not only the hairstyle but also the hair color (an operation of specifying the hairstyle and the hair color is accepted). In this case, the hairstyle identification unit 204 identifies in advance the hair color of the person in addition to the person's hairstyle from the posted image, and the captured image extraction unit 206 extracts a posted image that has a high score in terms of the hairstyle specified by the viewing user and that is of a hair color close to the hair color specified by the viewing user.

REFERENCE SIGNS LIST

1 Search system
10 Terminal
20 Server
200 Processing unit
201 Head region extraction unit
202 Orientation estimation unit
203 Mask image generation unit
204 Hairstyle identification unit
205 Operation accepting unit
206 Captured image extraction unit
210 Storage unit
220 Communication unit

The invention claimed is:

1. A computer-readable non-transitory information storage medium storing a program for retrieving, from among a plurality of captured images capturing a person, a captured image of a hairstyle specified by a user, the information storage medium storing the program causing a computer to operate as:
   a head region extraction unit configured to extract a head region of the person from the captured image;
   an orientation estimation unit configured to estimate a face orientation of the person from the head region;
   a mask image generation unit configured to generate a mask image in which a hair region and a remaining region in the head region are distinguished from each other;
   a hairstyle identification unit configured to identify a hairstyle of the person from the mask image using a result of the estimation of the face orientation;
   an operation accepting unit configured to accept an operation of specifying a hairstyle by a user; and
   a captured image extraction unit configured to extract the captured image based on the hairstyle specified in the operation and the identified hairstyle.

2. The information storage medium according to claim 1, wherein
   the storage medium of the computer stores a plurality of representative mask images that are the mask images each generated from the captured image prepared in advance and that are prepared respectively for face orientations and for hairstyles specifiable by the user;
   the hairstyle identification unit calculates degrees of similarity between the mask image and the representative mask images having a face orientation in common with the mask image; and
   the captured image extraction unit extracts the captured image corresponding to the mask image having a first degree of similarity with the representative mask image of the hairstyle specified in the operation.

3. The information storage medium according to claim 1, wherein
   the operation accepting unit accepts an image transmitted from a terminal of the user or an image drawn by the user, and treats a hairstyle of a person identified from the image as the hairstyle specified in the operation.

4. The information storage medium according to claim 1, wherein
   the operation accepting unit accepts, as the operation, an operation of adjusting a length and/or an amount of hair of a reference hairstyle, and treats the hairstyle after the adjustment as the hairstyle specified in the operation.

5. The information storage medium according to claim 1, wherein
   the hairstyle identification unit identifies a hair color of the person from the captured image;
   the operation accepting unit accepts an operation of specifying a hairstyle and a hair color by the user; and
   the captured image extraction unit extracts the captured image based on the hairstyle and hair color specified in the operation and the identified hairstyle and hair color.

6. A search system for retrieving, from among a plurality of captured images capturing a person, a captured image of a hairstyle specified by a user, the search system comprising:
   a head region extraction unit configured to extract a head region of the person from the captured image;

an orientation estimation unit configured to estimate a face orientation of the person from the head region;

a mask image generation unit configured to generate a mask image in which a hair region and a remaining region in the head region are distinguished from each other;

a hairstyle identification unit configured to identify a hairstyle of the person from the mask image using a result of the estimation of the face orientation;

an operation accepting unit configured to accept an operation of specifying a hairstyle by a user; and a captured image extraction unit configured to extract the captured image based on the hairstyle specified in the operation and the identified hairstyle.

7. A computer-readable non-transitory information storage medium storing a program, the program causing a computer to operate as:

a head region extraction unit configured to extract, from a captured image capturing a person, a head region of the person;

an orientation estimation unit configured to estimate a face orientation of the person from the head region;

a mask image generation unit configured to generate a mask image in which a hair region and a remaining region in the head region are distinguished from each other; and a hairstyle identification unit configured to identify a hairstyle of the person from the mask image, using a result of the estimation of the face orientation.

8. The information storage medium according to claim 7, wherein the storage medium of the computer stores a plurality of representative mask images that are the mask images each generated from the captured image prepared in advance and that are prepared respectively for a face orientation and for a hairstyle; and the hairstyle identification unit calculates degrees of similarity between the mask image and the representative mask images of respective hairstyles having a face orientation in common with the mask image, and treats a hairstyle having the highest degree of similarity as the hairstyle of the person.

9. The information storage medium according to claim 7, wherein the hairstyle identification unit identifies a hair color of the person from the captured image.

* * * * *